June 29, 1965    WILLIAM KWO-WEI CHEN    3,192,148
ELECTRODIALYSIS APPARATUS FOR FLUID TREATMENT
Original Filed March 6, 1961    4 Sheets-Sheet 1

INVENTOR
WILLIAM KWO-WEI CHEN
BY
ATTORNEY

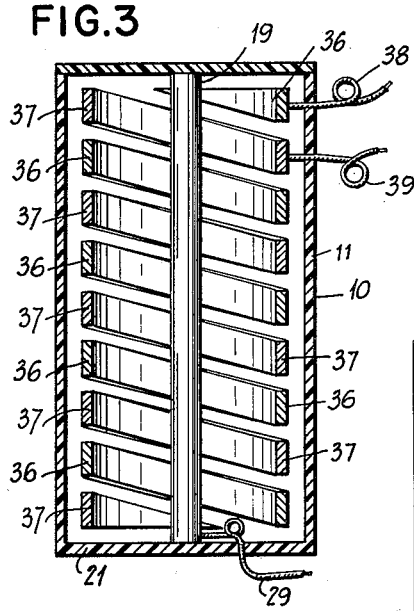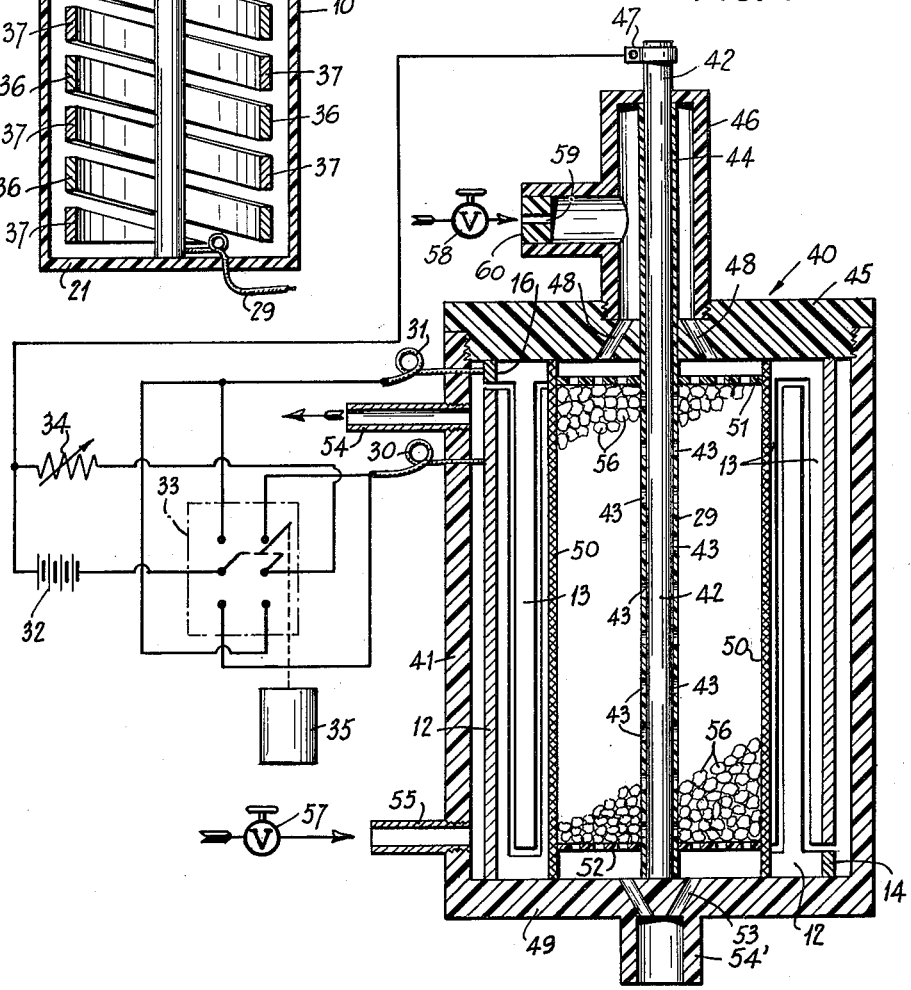

June 29, 1965  WILLIAM KWO-WEI CHEN  3,192,148
ELECTRODIALYSIS APPARATUS FOR FLUID TREATMENT
Original Filed March 6, 1961  4 Sheets-Sheet 3

INVENTOR
WILLIAM KWO-WEI CHEN
BY
ATTORNEY

June 29, 1965  WILLIAM KWO-WEI CHEN  3,192,148
ELECTRODIALYSIS APPARATUS FOR FLUID TREATMENT
Original Filed March 6, 1961  4 Sheets-Sheet 4

INVENTOR
WILLIAM KWO-WEI CHEN
BY
ATTORNEY

United States Patent Office 3,192,148
Patented June 29, 1965

3,192,148
ELECTRODIALYSIS APPARATUS FOR
FLUID TREATMENT
William Kwo-Wei Chen, Stamford, Conn., assignor to American Machine & Foundry Company, a corporation of New Jersey
Continuation of application Ser. No. 93,572, Mar. 6, 1961. This application Oct. 23, 1962, Ser. No. 233,200
20 Claims. (Cl. 204—301)

This application is a continuation of copending Serial No. 93,572, filed March 6, 1961, now abandoned.

This invention relates in general to electrodes for electrochemistry and, more particularly, to the construction and operation of electrodes in fluid treatment devices.

Precipitates and other products formed on or near an electrode may be deposited on the electrode to coat it or these materials may react with the substance of the electrode to form a coating on it. In such a case, the efficiency of the electrode will be impaired and eventually the electrode will cease to perform its function adequately. The efficiency of fluid treatment devices, such as electrodialysis devices and the like, rapidly falls off as the functioning of the electrodes is impaired.

In some electrodialysis devices it has been suggested that the electrodes be electrically reversed to clear themselves of precipitates so that the anode functions as a cathode and the cathode functions as an anode. During this period of electrical reversal the concentrating and diluting cells change their functions so that fluid flow through the electrodialysis device must either be reversed or the product and the concentrate streams must be interchanged. Generally time is required and product lost at each reversal by purging. However, in many applications it is neither possible nor desirable to reverse the fluid flow through the fluid treatment device or interchange the product and concentrate streams while the electrodes are electrically reversed.

It is, therefore, an object of this invention to provide an electrode in a fluid treatment device which may be electrically reversed without affecting the continued functioning of the fluid treatment device.

Another object of this invention is to provide at least two electrodes within a single electrode compartment so that, as one electrode functions as a cathode, the other electrode may be electrically reversed or held neutral and flushed to throw off precipitates and other products formed on it.

A further object of this invention is to provide self-cleaning electrodes which may be used for a longer period of time.

Yet another object of this invention is to provide, in a set of electrodes, interlocking electrodes each of which may present an effective area substantially equal to one-half the area occupied by the set of electrodes.

A still further object of this invention is to provide, in a fluid treatment device containing electrodes and ion selective membranes, a porous barrier or membrane adjacent to an electrode compartment so that fluid flows through the porous barrier or membrane into the electrode compartment to reduce the migration of undesirable ions, which may be formed at the electrodes, into the body of the fluid treatment device.

Yet another object of this invention is to prevent the migration of undesirable ions into the body of a fluid treatment device from an electrode compartment by placing a non-ion selective or neutral barrier adjacent to the electrode compartment and directing an electrode washing stream past the far side of the barrier and then directing it past the electrodes.

Many other objects, advantages, and features of invention reside in the construction, arrangement and combination of parts involved in the disclosed embodiment of the invention and its obvious modifications and its practice as will be understood from the following description and accompanying drawing wherein:

FIG. 3 is a vertical section through the cylindrical container of a spiral electrodialysis stack with the membranes removed to show a modified cathode construction;

FIG. 4 is a vertical section through a fluid treatment device containing electrodes with associated electrical elements according to this invention;

Figure 1:
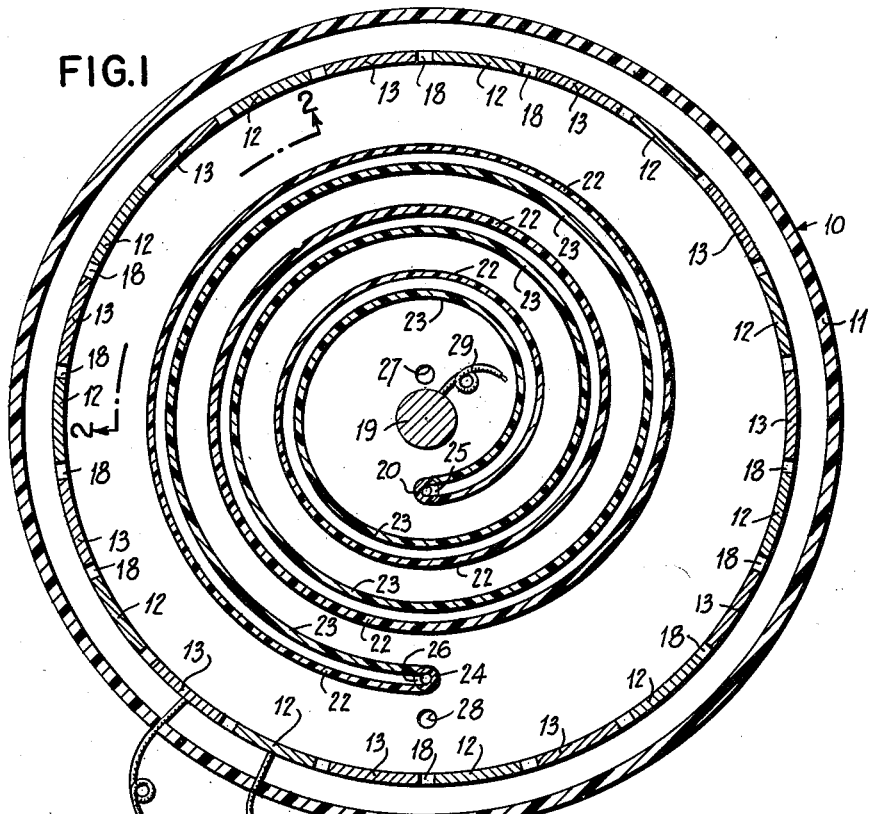
FIG. 1 is a horizontal section through a spiral electrodialysis stack containing electrodes constructed and electrically connected according to this invention.

Referring to the drawing in detail, FIG. 1 shows a spiral electrodialysis cell construction which is contained within a cylindrical, non-conductive tank 10 which may be formed from a plastic such as polyethylene or any other suitable material. Disposed within the tank 10 next to or near its vertical wall 11 are two electrodes 12 and 13.

Figure 2:
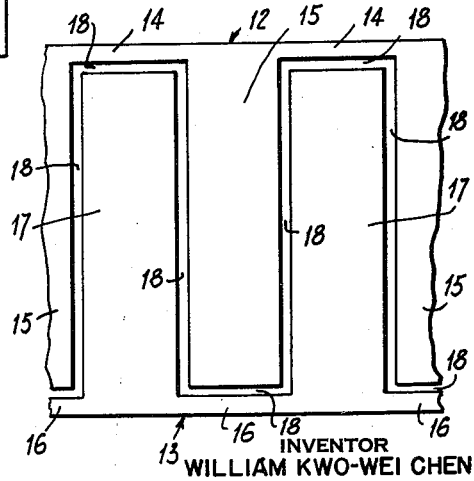
FIG. 2 is a section taken on line 2—2 of FIG. 1.

As shown in FIG. 2, one outer electrode 12 consists of a thin upper strip 14 from which projections 15 extend downward. The other outer electrode 13 consists of a thin lower strip 16 from which upward projections 17 extend between the projections 15 of the first electrode 12. Thus each outer electrode 12 or 13 occupies somewhat less than half the area effectively covered by both the outer electrodes 12 and 13. A suitable clearance 18 is left between the outer electrodes 12 and 13 so that they do not contact each other.

Referring again to FIG. 1, a central electrode 19 is disposed within the container 10. A tube 20 extends upward from the bottom wall 21 of the container 10. The tube 20 has two membranes 22 and 23 extending from two sides of it. The membranes 22 and 23 may be joined together near the top and bottom of the container 10, or they may be fixed to the top and bottom walls of the container 10. The membranes 22 and 23 are wound about the central electrode 19 and about themselves to define a spiral flow path as shown in FIG. 1. The membranes 22 and 23 terminate by being fixed to the tube 24 which also extends through the bottom wall 21 of the container 10.

The tube 20 contains a series of small apertures 25 which communicate between the membranes 22 and 23. In a like manner, the tube 24 contains a number of small apertures 26 which also communicate between the membranes 22 and 23. A suitable spacer material (not shown) such as expanded plastic may be placed between the membranes 22 and 23 to hold them in their relative positions as shown in FIG. 1. If it is desired, additional spacer means may be placed between the spiral windings of the membranes 22 and 23 to hold them in position. An aperture 27 is formed in the bottom wall 21 of the container 10 near the central electrode 19 and another aperture 28 is formed in the bottom wall 21 near or beyond the outer electrodes 12 and 13.

A lead 29 extends from the central electrode 19 through the bottom wall 21 of the container 10. The leads 30 and 31 extend from the outer electrodes 12 and 13 through the side wall 11 of container 10. A suitable source of electric current 32 is connected to a lead 29 so that the central electrode 19 functions as an anode. The current source 32 is also connected through the reversing switch 33 to the leads 30 and 31 so that, when the two-pole double throw switch 33 is closed in either direction, one of the outer electrodes 12 or 13 will function as a cathode. The other outer electrode 12 or 13 will then be connected through a variable resistance 34 to function as a weak anode.

This embodiment of the invention operates as follows. Fluids to be treated is introduced through a tube 20 to flow through the apertures 25 between the membranes 22 and 23. This fluid will travel along the spiral path defined by the adjacent membranes 22 and 23 until it passes through the apertures 26 to enter the discharge tube 24 and flow from the electrodialysis apparatus. If the membrane 23 is anion permeable and the membrane 22 is cation permeable, anions will pass through membrane 23 and cations will pass through membrane 22 so that fluid flowing between these membranes becomes increasingly diluted as it approaches tube 24. Either membrane may also be neutral. As ions pass through the ion permeable membranes 22 and 23, the fluid within the container 10 becomes a more and more concentrated solution. Fluid is therefore introduced into the container 10 through an aperture 27 so that it may wash the anode 19 and then wash the concentrate from the container 10 as it flows from the container 10 through aperture 28. If a series of suitably placed apertures 28 are provided, the fluid entering the container 10 through the aperture 27 may also serve to wash the outermost electrodes 12 and 13.

As has been pointed out if a switch 33 were closed in its upper position so that a lead 30 was connected to the current source 32, the outer electrode 12 would then function as a cathode. While the switch 33 was in this upper position, the outer electrode 13 would have current flowing to it from the current source 32 through the resistance 34 so that the electrode 13 would be a very weak anode.

It has been found that complete area coverage is not required of an electrode in electrodialysis and other fluid treatment devices. Since the outer electrode 12 covers somewhat less than one-half of the area surrounding the central electrode 19, it functions quite adequately as a cathode. It has been further found that a weak anode functioning next to a cathode will not affect the functioning of the cathode. If a suitable timer control 35 periodically throws the reversing switch 33, when the switch 33 is closed in the downward position, the other outer electrode 13 will function as a cathode while one outer electrode 12 functions as a weak anode. At this time any precipitates which had formed on the first outer electrode 12 while it was functioning as a cathode will tend to be dislodged upon the electrical reversal and the concomitant weak anodic functioning of the electrode 12. After a suitable interval of time, the timer control 35 may again throw the reversing switch 33 into its upper position so that the now cleaned or cleared electrode 12 functions again as a cathode while the other outer electrode 13 functions as a weak anode to clear itself of precipitates.

FIG. 3 shows a modification of this invention in which a container 10 contains the central anode 19 and the cathodes 36 and 37. The ion selective membranes (not shown) would be disposed between the central electrode 19 and the outer electrodes 36 and 37. The outer electrodes 36 and 37 are wound as helices with one electrode 37 disposed between adjacent turns of the other electrode 36. The leads 38 and 39 are connected to the electrodes 36 and 37. These leads 29, 38 and 39 are connected to associated electrical elements such as those described for the embodiment of the invention shown in FIG. 1.

FIG. 4 shows a fluid treatment unit 40 which has a cylindrical outer casing 41 formed of a non-conducting plastic. Within the outer casing 41 there are disposed two electrodes 12 and 13 which are of platinum or other inert material and identical to those shown in FIG. 2. In the center of casing 41 there is disposed the anode 42 which is formed of carbon.

A tubular sleeve 44 encases the carbon anode and prevents fluid from contacting it except through the apertures 43 which are formed in the sleeve 44 within the body of the cylindrical casing 41. The anode 42 and the sleeve 44 extend through an aperture in the cover 45 of the casing 41. A T-fitting 46 is fixed to the cover 45 about the sleeve 44. A central electrode 42 extends through the top of the T-fitting 46 and carries a terminal strap 47 on its uppermost end. Passages 48 extend through the cover 45 to conduct fluid from the T-fitting 46 into the body of the cylindrical container 41.

Extending between the bottom wall 49 of the container 41 and the cover 45 is the cylindrical tubular permeable diaphragm or barrier 50 which may be formed of ceramic material and which is interposed between the anode 42 and the electrodes 12 and 13. Two perforated disks 51 and 52 extend outward from the sleeve 44 to the barrier 50 so that, with the barrier 50, they define a cylindrical fluid treatment chamber. Apertures 53 are formed in the bottom wall 49 to conduct fluid into the protrusion 54' which may be connected to suitable tubing.

Two tubes 54 and 55 extend into the upper and lower portions of the cylindrical casings 41. The particles 56 may completely fill the fluid treatment chamber defined between the sleeve 44 and the barrier 50 and the perforated disks 51 and 52. The holes formed in the disks 51 and 52 are sufficiently small to prevent the escape of the individual particles 56 from the fluid treatment chamber. The particles 56, which form an ion exchange bed, are preferably made up of a mixture of discrete particles of cation exchange material and discrete particles of anion exchange material. Depending upon the application of this fluid treatment device, the particles may comprise only particles of cation exchange material, for example. If the two types of particles are used together, they are heterogenously mixed about 50%–50% by volume to produce approximately equal cation and anion exchange capacities. These materials may comprise those sold under trademarks "Amberlite IR-20" and "Amberlite IRA-400."

This fluid treatment device may be used as follows to reduce the total amount of dissolved solids in water to a tolerable value. The valve 57 is set to admit a continuous very small flow of water into the container 41 through the tube 55. Water to be treated is intermittently introduced into the device through the valve 58 so that it enters the T-fitting 46 at a controlled rate through the orifice 59 in the rubber plug 60.

The same electrical elements which were described with the first embodiment of the invention are connected in a like manner to the leads 30 and 31 and the terminal 47. The current source 32 is connected to the anode 42 and to one of the cathodes 12 or 13 through the leads 30 and 31. If the switch 33 is in the uppermost position, the electrode 13 will function as a cathode. Therefore, by means of the current source 32, a voltage is continuously impressed on the anode 42 and on one of the cathodes 12 or 13.

When water to be treated is introduced periodically through valve 58 into the T-fitting 46 to pass through the passages 48 and then between the ion exchange particles 56, substantial amounts of the cations and anions of the electrolytes dissolved in the water to be treated are held by the ion exchange particles and thus effectively removed from solution. However, ion exchange particles are relatively quickly depleted as to exchange capacity.

Before this takes place, the valve 58 closes and admits no more fluid to be treated for a given period of time. The fluid which is treated passes from the container 41 by passing through the apertures in the disk 52, through the channels 53 and into the projection 54'.

After fluid to be treated stops flowing through the unit 40, a current from the current source 32 continues to be impressed upon the anode 42 and one of the cathodes 12 or 13. The continuous flow of current from the anode to the cathode partially regenerates the particles 56. The cation exchange particles 56 are regenerated by the release of the cations of the previously exchanged metal salts and by the recapture of hydrogen ions from the anolyte. The cations diffuse through the permeable barrier 50 into the continuously flowing catholyte and are thus transported from the interior of the unit 40 through the tube 54'. Similarly, the anion exchange particles 56 are regenerated by the release of ions of the previously exchanged metal salts and by the recapture of hydroxyl ions from the catholyte.

Since, in a fluid treatment device of this nature, the electrodes 12 or 13 and 42 must continually function, any precipitation on a single cathode would seriously impair the use of the fluid treatment device as this would tend to prevent the regeneration of the particles 56. However, as shown in FIG. 4, the timer control 35 periodically reverses the switch 33 from the upper to the lower position so that, while one electrode 13 functions as a cathode, the other electrode 12 functions as a weak anode. After a period of time when the timer control 35 reverses the switch 33, the second electrode 12 functions as a cathode and the first electrode 13 functions as a weak anode. This current reversal, as has been explained, does not affect the operation of the electrodes and it prevents them from being rendered inoperative by the build-up of harmful precipitates.

Figure 5:
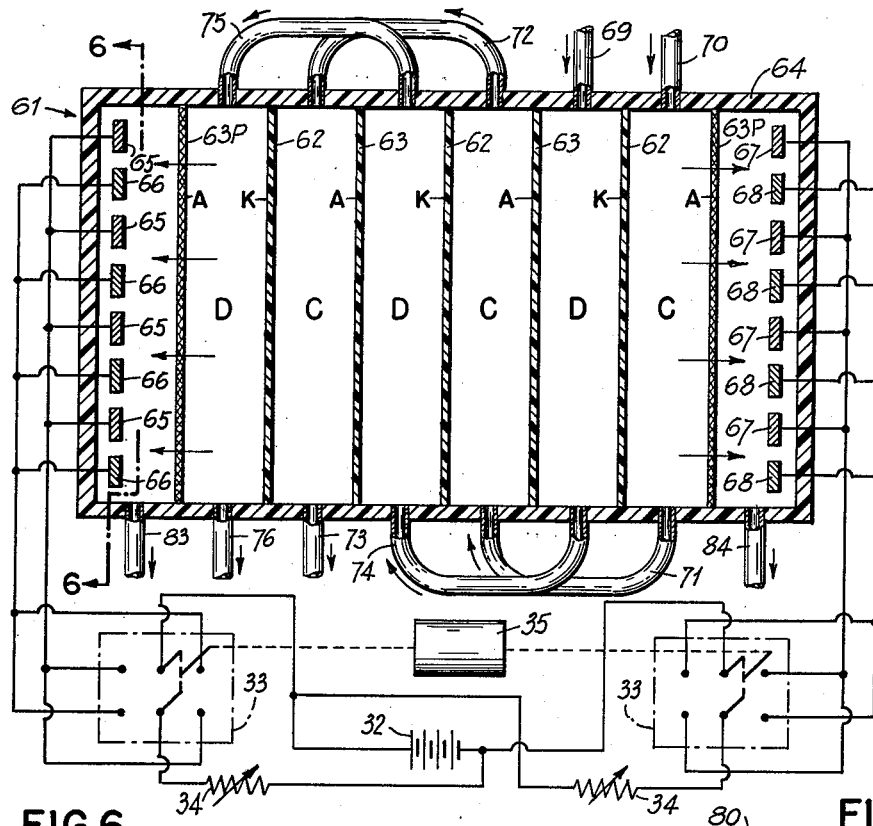
FIG. 5 is a longitudinal vertical section through a rectangular electrodialysis stack containing two sets of anodes and two sets of cathodes electrically connected according to this invention.

FIG. 5 shows a conventional rectangular electrodialysis stack 61. Using suitable gasketing techniques or other means, the membranes 61 and 63 are alternately assembled within a container 64 to form fluid treatment compartments between adjacent membranes designated D and C. Some membranes 62 are cation permeable and other membranes 63 are anion permeable. The outermost membranes 63P are anion permeable membranes and, in addition, are porous to some extent.

Figure 6:
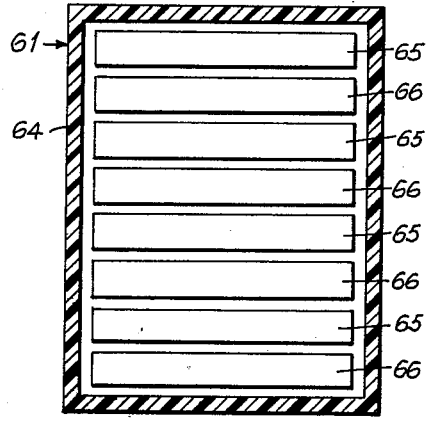
FIG. 6 is a section taken on line 6—6 of FIG. 5.

Referring also to FIG. 6, it may be seen that alternate sets of parallel electrodes 65 and 66 are placed at one end of the electrodialysis stack 61 while alternate sets of electrodes 67 and 68 are placed at the other end of the stack 61.

Fluid to be treated enters the electrodialysis stack through pipes 69 and 70. Fluid from one pipe 70 passes through a cell, designated C, and is then carried past the adjacent cell, labeled D, to another cell, labeled C, by means of another pipe 71. Another pipe 72 conducts fluid from this cell, designated C, to another cell, designated C, from which a concentrate stream emerges through a pipe 73. Meanwhile, fluid from a pipe 69 passes through the cell, designated D, to flow through a pipe 74 into another cell, designated D, from which it passes through another pipe 75 to yet another cell, designated D, to flow from the electrodialysis stach as a product stream through a pipe 76. If the electrodes 65 and 68 are connected to a current source 32 to function as an anode and a cathode respectively, the cells, designated C, will become concentrating cells, while the cells, designated D, will become diluting cells.

In some particular applications it may prove desirable to have either the anode or the cathode electrically reversed or to have both the anode and the cathode electrically reversed. Should it be desirable to reverse both the anode and the cathode in an electrodialysis stack to prevent the formation of harmful precipitates at both the anode and the cathode, a single current source 32 would be provided with two variable resistors 34 and two reversing switches 33 which may be activated by a single timer control 35. If the timer control throws both switches 33 to the right as shown in FIG. 5, some electrodes 66 will function as anodes and the other electrodes 67 will function as cathodes. At the same time, some electrodes 65 will be slightly cathodic and some electrodes 68 will be slightly anodic. When the timer control 35 throws the switches 33 to the left, some electrodes 65 will function as anodes while some electrodes 68 function as cathodes. At this time, the electrodes 66 will be slightly cathotic while the other electrodes 67 will be slightly anodic. This will tend to remove precipitates which had formed on the electrodes 66 and 67.

Figure 7:
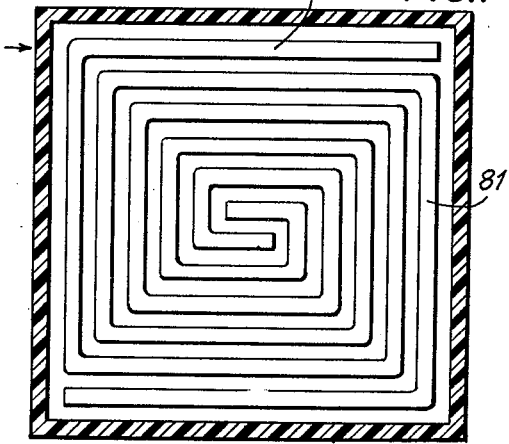
FIG. 7 is an end view of a set of modified electrodes within a rectangular electrodialysis stack.

FIG. 7 shows the end of an electrodialysis stack containing two electrodes 80 and 81 which are disposed to be alternately used in the manner of this invention.

Referring again to FIG. 5, should harmful materials be formed in either the anode or the cathode compartment, the dilute and concentrate streams emerging from the pipes 76 and 73 could become contaminated with these materials if they migrated through adjacent membranes 63P. In some applications, this may be highly undesirable. Acids and hypochlorites produced at the anode, and bases produced at the cathode, may be drawn into the adjacent compartments. Hydroxyl anion migration into the concentrate stream is particularly undesirable in that it may cause precipitation of calcium and magnesium salts with the resulting blocking of the electrodialysis cells. One method whereby the migration of these products into the adjacent cells may be greatly lessened is by providing porous ion selective membranes 63P adjacent to the electrode compartments. As shown in FIG. 5, the anion permeable membranes 63P are slightly porous so that fluid is constantly passing from the adjacent electrodialysis cells into the anode and cathode compartments to wash the electrodes and pass from the electrodialysis stack 61 through the pipes 83 and 84. It is difficult for products to migrate through porous membranes against the flow through them.

Figure 8:
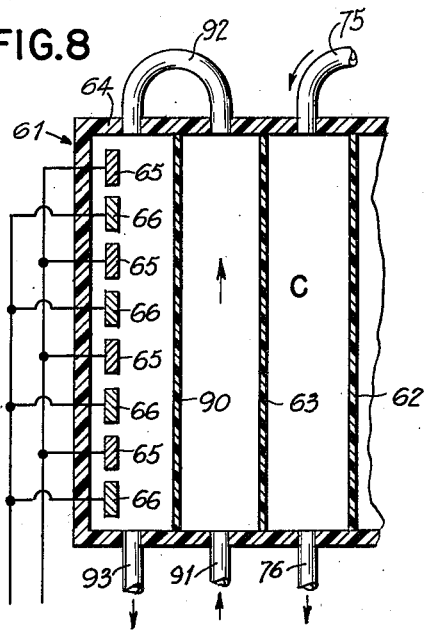
FIG. 8 is a vertical section through a fragment of the end of a rectangular electrodialysis stack having an electrode washing stream pass about a non-ion selective barrier.

Referring now to FIG. 8, a rectangular electrodialysis stack similar to that shown in FIG. 5 is constructed so that a fluid treatment cell is formed between the last two membranes 63 and 62. Membranes 63 are anion permeable and membranes 62 are cation permeable. Fluid flows in and out of this cell through the pipes 75 and 76. This cell is designated C in FIG. 8 and would function as a concentrating cell if the electrodes 65 and 66 functioned as cathodes. To isolate the electrode compartment from the adjacent fluid treatment cell C, a non-ion selective barrier 90 is placed between the electrodes 65 and 66 and the nearest fluid treatment cell C. A pipe 91 conducts fluid into the space between the barrier member 90 and the nearest ion selective membrane 63. Fluid flows through this space to enter the pipe 92 and be returned on the other side of the barrier 90 to wash the electrodes 65 and 66 and flow from the stack 61 through the pipe 93. The barrier 90 may be formed from a non-ion selective membrane, an inert, non-woven material such as matting of vinyl chloride and acrylonitrile, or the like. Therefore, contaminants generated at the electrodes 65 and 66 which may pass through the barrier 90 will be washed through the pipe 92 and returned to the proximity of the electrodes 65 and 66 to be evacuated from the stack through the pipe 93. This isolation system not only prevents contamination of fluids in adjacent fluid treatment cells, but it prevents degradation agents generated at the electrodes from attacking adjacent ion selective membranes 62 and 63. This feature of the invention allows an electrodialysis stack to function for an extended period of time.

Figure 9:
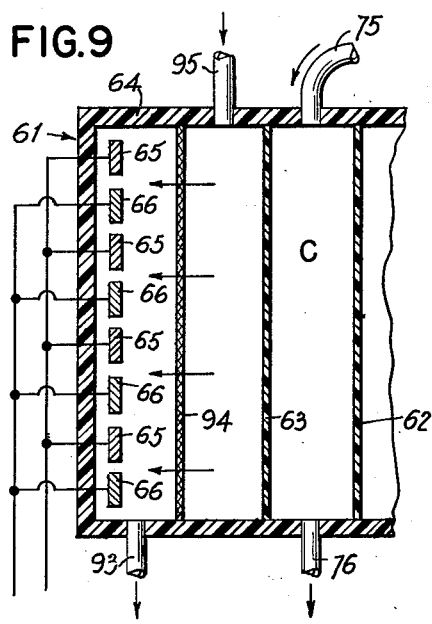
FIG. 9 is a vertical section through a fragment of the end of a rectangular electrodialysis stack within which an electrode washing stream passes through a porous barrier.

FIG. 9 shows the same electrodialysis stack 61 as shown in FIG. 8 with a porous barrier 94 of ceramic material, non-woven plastic matting, or the like, placed adjacent to the electrodes 65 and 66. A pipe 95 directs an electrode washing stream into the space between the barrier 94 and the adjacent membrane 63. This electrode washing stream then passes through the barrier 94 to wash the electrodes 65 and 66 and pass from the stack through the pipe 93. Since almost any desired rate of flow may be maintained through the barrier 94, it may effectively block any migration of contaminating products generated at the electrodes 65 and 66 from moving toward the adjacent membrane 63.

While the alternately used electrodes of this invention have been shown in various forms in use in two types of electrodialysis apparatus and a water softener, it is to be understood that this invention is not limited to these particular applications which are given as examples. For example, one set of electrodes may remain passive or neutral while the other set operates, or more than two sets of electrodes may be used in sequence controlled by rotary multipole switches.

Under 35 USC 120, the benefit of the filing date March 6, 1961 of copending application Serial No. 93,572 is hereby claimed.

What is claimed is:

1. An electrochemical fluid treatment device comprising at least one membrane which defines fluid paths in a container between electrodes, first, second and third electrodes, the second and third electrodes being in proximity to one another and spaced from the first electrode, means for supplying current to the electrodes so that the second and third electrodes are of opposite polarities, means for reversing the polarities of the second and third electrodes while maintaining the first electrode fixed in polarity, and means for maintaining that one of the second and third electrodes which at any time is of the same polarity as the first electrode weaker in polarity than the other of said second and third electrodes.

2. A device according to claim 1 including a source of direct current, a reversing switch coupled to the second and third electrodes, a first electrical conductor from the current source to the first electrode, a branch electrical conductor from said first conductor to said switch, a variable resistance in said branch conductor, and a second electrical conductor from said current source to said switch.

3. A fluid treatment device comprising a central electrode, ion selective membranes disposed at least partially about said central electrode, said ion selective membranes defining at least one fluid treatment cell beyond said central electrode, at least one second electrode disposed beyond said membranes, at least one third electrode disposed beyond said membranes substantially the same distance from said central electrode as said second electrode, and means selectively applying a current to said central electrode and said second and third electrodes while selectively applying a weaker current to said second and third electrodes.

4. The combination according to claim 3 in which said means to apply a current to said electrodes comprises a current source, a resistance, means connecting said current source to said central electrode and said resistance, and a reversing switch connecting said current source and said resistance to said second and third electrodes.

5. The combination according to claim 4 in which said central electrode functions as an anode and said second and third electrodes selectively function as a cathode and a weak anode.

6. The combination according to claim 3 in which said second and third electrodes are each formed into a helix extending beyond said ion selective membranes, the turns of one helix lying between the turns of the other.

7. A fluid treatment device comprising a central electrode, ion selective membranes disposed about said central electrode, said membranes defining at least one fluid treatment cell, a second electrode disposed beyond said membranes, said second electrode having a lower narrow circular portion and upwardly extending projections from said lower portion, a third electrode disposed beyond said ion selective membranes, said third electrode having an upper narrow portion and downwardly extending projections from said upper portion extending between the upward projections of said second electrode, a current source, a resistance, means connecting said current source to said central electrode and said resistance so that said central electrode functions as an anode, a reversing switch connecting said current source and said resistance to said second and third electrodes, and timing control means to control the position of said reversing switch so that said second and third electrodes each alternately function as a cathode.

8. A fluid treatment device comprising a first electrode, a second electrode and a third electrode, said second electrode being disposed in close proximity to said third electrode substantially the same distance from said first electrode as said third electrode, means defining a fluid treatment volume divided by a membrane disposed between said first electrode and said second and third electrodes, and means to apply a current selectively to said first electrode and said second and third electrodes.

9. A fluid treatment device comprising a central electrode, a porous cylindrical barrier disposed about said central electrode and forming a fluid treatment compartment between said barrier and said central electrode, discreet particles of ion exchange material within said fluid treatment compartment, a second electrode disposed about said barrier and containing openings, a third electrode disposed about said barrier and extending at least partially within the openings in said second electrode, said second and third electrodes being disposed the same distance from said central electrode, a current source, a resistance, means connecting said current source to said central electrode and said resistance so that said central electrode functions as an anode, a reversing switch connecting said current source and said resistance to said second and third electrodes, and means periodically operating said reversing switch so that said second and third electrodes each alternately function as a cathode and a weak anode.

10. An electrodialysis stack according to claim 8 including discreet particles of ion exchange materials within the fluid treatment volume.

11. An electrodialysis stack comprising membranes at least some of which are ion selective, said membranes defining fluid treatment cells, at least one first electrode disposed beyond said membranes, at least one second electrode disposed opposite said first electrode beyond said membranes, at least one third electrode disposed adjacent to said second electrode at substantially the same distance from said first electrode as said second electrode, and means selectively applying a current to said first electrode and said second and third electrodes.

12. An electrodialysis stack according to claim 11 in which the means for selectively applying current to the electrodes is adapted to apply a first current to the first electrode and the second and third electrodes while impressing a second weaker current between said second and third electrodes.

13. The combination according to claim 11 in which there is a plurality of said second and third electrodes, said second electrodes being disposed parallel to each other, said third electrodes being disposed between said second electrodes.

14. The combination according to claim 11 in which said second electrode describes a substantially spiral path from the central portion of said electrodialysis stack and in which said third electrode describes a substantially spiral path from the central portion of said electrodialysis stack, said third electrode being disposed between the turns of said second electrode.

15. An electrodialysis stack comprising at least one first electrode, at least one second electrode, at least one third electrode in close proximity to said second electrode and disposed at the same distance from said first electrode as said second electrode, membranes at least some of which are ion selective defining fluid treatment cells and being disposed between said first electrode and said second and third electrodes, means introducing fluid to be treated between said membranes under pressure so that fluid to be treated flows through at least some fluid treatment cells defined by said membranes, at least one of said membranes adjacent to at least one of said electrodes being porous so that some fluid being treated flows through said porous membrane towards an electrode, and means to conduct fluid passing through said porous membrane away from said electrode.

16. An electrodialysis device having electrodes and membranes at least some of which are ion selective disposed between said electrodes, said membranes defining fluid treatment cells, means introducing fluid to be treated under pressure into the fluid treatment cells defined by said membranes, at least one of said membranes adjacent to an electrode being porous so that some fluid to be treated flows through said porous membrane towards an electrode, and means conducting fluid which has passed through said porous membrane away from said electrode.

17. An electrolytic device having at least one electrode, means defining a fluid treatment cell adjacent to said electrode, a barrier between said electrode and said fluid treatment cell, means introducing fluid under pressure between said barrier and said fluid treatment cell, means conducting said fluid under pressure from between said barrier and said fluid treatment cell to the side of said barrier adjacent to said electrode, and means conducting said fluid under pressure from said electrode.

18. The combination according to claim 17 in which at least one electrode comprises a first electrode element and a second electrode element, and with the addition of means alternately impressing an electrical potential of a given polarity on one of said electrode elements while impressing a weaker potential of the opposite polarity on the other of said elements.

19. A fluid treatment device comprising at least a first electrode and a second electrode, a porous barrier adjacent to said electrodes, means defining a fluid treatment bed beyond said porous barrier, an electrode washing stream, means introducing said electrode washing stream between said means defining a fluid treatment bed and said porous barrier, said electrode washing stream passing through said porous barrier, means conducting said washing stream away from said first and second electrodes, and means alternately impressing an electrical potential of a given polarity on each of said first and second electrodes.

20. A fluid treatment device having at least one electrode, a porous barrier disposed adjacent to said electrode, means defining a fluid treatment area beyond said porous barrier, an electrode washing stream, means introducing said electrode washing stream between said porous barrier and said means defining a fluid treatment area, said electrode washing stream passing through said porous barrier, and means conducting said electrode washing stream away from said electrode.

References Cited by the Examiner

UNITED STATES PATENTS

| 1,529,249 | 3/25 | Gue | 204—231 |
| 1,567,791 | 12/25 | Duhme | 204—231 |
| 2,696,466 | 12/54 | Beaver | 204—231 |
| 2,752,306 | 6/56 | Juda | 204—151 |

FOREIGN PATENTS

| 1,132,970 | 11/56 | France. |

WINSTON A. DOUGLAS, *Primary Examiner.*

JOHN R. SPECK, *Examiner.*